United States Patent [19]

Hayes

[11] 3,909,394

[45] Sept. 30, 1975

[54] CATALYTIC REFORMING WITH A CATALYST CONTAINING PLATINUM OR PALLADIUM AND RUTHENIUM

[75] Inventor: John C. Hayes, Palatine, Ill.

[73] Assignee: Universal Oil Products Company, Des Plaines, Ill.

[22] Filed: Jan. 18, 1974

[21] Appl. No.: 434,736

Related U.S. Application Data

[62] Division of Ser. No. 291,138, Sept. 21, 1972, abandoned.

[52] U.S. Cl. .............................. 208/139; 252/441
[51] Int. Cl.² ...................................... C10G 35/08
[58] Field of Search ........................ 208/139, 138

[56] References Cited
UNITED STATES PATENTS

| | | | |
|---|---|---|---|
| 3,173,857 | 3/1965 | Haensel | 208/139 |
| 3,617,519 | 11/1971 | Hayes | 208/139 |
| 3,702,294 | 11/1972 | Rausch | 208/139 |
| 3,759,841 | 9/1973 | Wilhelm | 252/441 |
| 3,775,301 | 11/1973 | Hayes | 208/139 |

*Primary Examiner*—Delbert E. Gantz
*Assistant Examiner*—Juanita M. Nelson
*Attorney, Agent, or Firm*—James R. Hoatson, Jr.; Thomas K. McBride; William H. Page, II

[57] ABSTRACT

Hydrocarbons are converted by contacting them at hydrocarbon conversion conditions with a bimetallic acidic catalyst comprising a combination of catalytically effective amounts of a platinum or palladium component, a ruthenium component and a halogen component with a porous carrier material. The components are present in the bimetallic catalyst in amounts, calculated on an elemental basis, corresponding to about 0.01 to about 2 wt. % platinum or palladium, about 0.01 to about 2 wt. % ruthenium and about 0.1 to about 3.5 wt. % halogen. Moreover, the platinum or palladium component and the ruthenium component are uniformly dispersed throughout the porous carrier material and substantially all of the platinum or palladium component and the ruthenium component are present in the corresponding elemental metallic states while substantially all of the halogen component is present in the form of the combined halide. A specific example of the hydrocarbon conversion process disclosed is a process for reforming a gasoline fraction wherein the gasoline fraction and hydrogen are contacted with the disclosed bimetallic catalyst at reforming conditions. Also disclosed in a trimetallic catalyst comprising a combination of a Group IVA metallic component with the bimetallic catalyst.

17 Claims, No Drawings

CATALYTIC REFORMING WITH A CATALYST CONTAINING PLATINUM OR PALLADIUM AND RUTHENIUM

CROSS-REFERENCE TO RELATED APPLICATION

The present application is a division of my prior, copending application Ser. No. 291,138 which was filed on Sept. 21, 1972 now abandoned. All of the teachings of this prior application being specifically incorporated herein by reference.

The subject of the present invention is a novel, bimetallic catalytic composite which has exceptional activity and resistance to deactivation when employed in a hydrocarbon conversion process that requires a catalyst having both a hydrogenation-dehydrogenation function and a cracking function. More precisely, the present invention involves a novel dual-function bimetallic catalytic composite, which quite surprisingly, enables substantial improvements in hydrocarbon conversion processes that have traditionally used a dual-function catalyst. In another aspect, the present invention comprehends the improved processes that are produced by the use of a catalytic composite comprising a combination of catalytically effective amounts of a platinum or palladium component, a ruthenium component, and a halogen component with a porous carrier material in a manner selected to insure a uniform distribution of these components throughout the carrier material; specifically, an improved reforming process which utilizes the subject catalyst to improve activity, selectivity, and stability characteristics.

Composites having a hydrogenation-dehydrogenation function and a cracking function are widely used today as catalysts in many industries such as the petroleum and petrochemical industry, to accelerate a wide spectrum of hydrocarbon conversion reactions. Generally, the cracking function is thought to be associated with an acid-acting material of the porous, adsorptive, refractory oxide type which is typically utilized as the support or carrier for a heavy metal component such as the metals or compounds of metals of Groups V through VIII of the Periodic Table to which are generally attributed the hydrogenation-dehydrogenation function.

These catalytic composites are used to accelerate a wide varity of hydrocarbon conversion reactions such as hydrocracking, isomerization, dehydrogenation, hydrogenation, desulfurization, cyclization, alkylation, polymerization, cracking, hydroisomerization, etc. In many cases, the commercial applications of these catalysts are in processes where more than one of these reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of napthenes and paraffins and the like reactions, to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction which is relatively rich in straight-chain paraffin compounds is contacted with a dual-function catalyst to produce an output steam rich in isoparaffin compounds.

Regardless of the reaction involved or the particular process involved, it is of critical important that the dual-function catalyst exhibit not only the capability to initially perform its specified functions, but also that it has the capability to perform them satisfactorily for prolonged periods of time. The analytical terms used in the art to measure how well a particular catalyst performs its intended functions in a particular hydrocarbon reaction environment are activity, selectivity and stability. And for purposes of discussion here, these terms are conveniently defined for a given charge stock as follows: (1) activity is a measure of the catalyst's ability to convert hydrocarbon reactants into products at a specified severity level where severity level means the specific reaction conditions used — that is, the temperature, pressure, contact time, and presence of diluents such as $H_2$; (2) selectivity refers to the amount of desired product or products obtained relative to the amount of reactants charged or converted; (3) stability refers to the rate of change with time of the activity and selectivity parameters — obviously, the smaller rate implying the more stable catalyst. In a reforming process, for example, activity commonly refers to the amount of conversion that takes place for a given charge stock at a specified severity level and is typically measured by octane number of the $C_5^+$ product stream; selectivity refers to the amount of $C_5^+$ yield that is obtained at a particular activity level; and stability is typically equated to the rate of change with time of activity, as measured by octane number of $C_5^+$ product, and of selectivity, as measured by $C_5^+$ yield. Actually, the last statement is not strictly correct because generally a continuous reforming process is run to produce a constant octane $C_5^+$ product with severity level being continuously adjusted to attain this result; and, furthermore, the severity level is for this process usually varied by adjusting the conversion temperature in the reaction zone so that, in point of fact, the rate of change of activity finds response in the rate of change of conversion temperature and changes in this last parameter are customarily taken as indicative of activity stability.

As is well known to those skilled in the art, the principal cause of observed deactivation or instability of a dual-function catalyst when it is used in a hydrocarbon conversion reaction is associated with the fact that coke forms on the surface of the catalyst during the course of the reaction. More specifically, in these hydrocarbon conversion processes, the conditions utilized typically result in the formation of heavy, high molecular weight, black, solid or semi-solid, carbonaceous material which coats the surface of the catalyst and reduces its activity by shielding its active sites from the reactants. In other words, the performance of this dual-function catalyst is sensitive to the presence of carbonaceous deposits on the surface of the catalyst. Accordingly, the major problem facing workers in this area of the art is the development of more active and selective catalytic composites that are not as sensitive to the presence of these carbonaceous materials and/or have the capability to suppress the rate of the formation of these carbonaceous materials on the catalyst. Viewed in terms of performance parameters, the problem is to develop a dual-function catalyst having superior activity, selectivity and stability. In particular, for a reforming process the problem is typically expressed in terms of shifting and stabilizing the $C_5^+$ yield-octane relationship 13 $C_5^+$ yield being representative of selectivity and octane being proportional to activity.

I have now found a dual-function bimetallic catalytic composite which possesses improved activity, selectivity and stability characteristics when it is employed in a process for the conversion of hydrocarbons of the type which have heretofore utilized dual-function catalytic composites such as processes for isomerization, hydroisomerization, dehydrogenation, desulfurization, denitrogenization, hydrogenation, alklation, dealkylation, hydrodealkylation, transalkylation, cyclization, hydrocyclization, cracking, hydrocracking, reforming, and the like processes. In particular, I have determined that the case of a catalytic composite comprising a combination of catalytically effective amounts of a platinum or palladium component, a ruthenium component and a halogen component with a porous refractory carrier material can enable the performance of hydrocarbon conversion processes utilizing dual-function catalyst to be substantially improved if the components are uniformly distributed throughout the carrier material. Moreover, I have discerned that a catalytic composite comprising a combination of catalytically effective amounts of a platinum or palladium component, a ruthenium component and a halogen component with an alumina carrier material can be utilized to substantially improve the performance of a reforming process which operates on a low octane gasoline fraction to produce a high octane reformate. In the case of a reforming process, the principal advantage associated with the use of the novel catalyst of the present invention involves the acquisition of the capability to operate in a stable manner in a high severity operation; for example, a low pressure reforming process designed to produce a $C_5^+$ reformate having an octane of about 100F-1 clear. As indicated the present invention essentially involves the finding that the addition of a ruthenium component to a dual-function hydrocarbon conversion catalyst containing a platinum or palladium component and a halogen component enables the performance characteristics of the catalyst to be sharply and materially improved if the components are uniformly dispersed in the carrier material.

It is, accordingly, one object of the present invention to provide a bimetallic hydrocarbon conversion catalyst having superior performance characteristics when utilized in a high severity hydrocarbon conversion process. A second object is to provide a bimentallic catalyst having dual-function hydrocarbon conversion performance characteristics that are relatively insensitive to the deposition of hydrocarbonaceous material thereon. A third object is to provide preferred methods of preparation of this bimetallic catalytic composite which insures the achievement and maintenance of its properties. Another object is to provide an improved reforming catalyst having superior activity, selectivity and stability in a high severity operation. Yet another object is to provide a dual-function hydrocarbon conversion catalyst which utilizes a ruthenium component to promote a platinum or palladium component.

In brief summary, the present invention is, in one embodiment, a catalytic composite comprising a porous carrier material having uniformly distributed therethrough catalytically effective amounts of a platinum or palladium component, a ruthenium component, and a halogen component. The porous carrier material is typically a porous, refractory material such as a refractory inorganic oxide, and the ruthenium component, the platinum or palladium component and the halogen component are usually utilized in relatively small amounts which are effective to promote the desired hydrocarbon conversion reaction.

A second embodiment relates to a catalytic composite comprising an alumina carrier material having catalytically effective amounts of a platinum or palladium component, a ruthenium component and a halogen component uniformly distributed therethrough. These components are preferably present in the composite in amounts sufficient to result in the final composite containing, on an elemental basis, about 0.1 to about 3.5 wt. % halogen, about 0.01 to about 2 wt. % platinum or palladium and about 0.01 to about 2 wt. % ruthenium.

Another embodiment relates to a catalytic composite comprising a combination of the catalytic composite described above in the first embodiment with a sulfur component in an amount sufficient to incorporate about 0.05 to about 0.5 wt. % sulfur, calculated on an elemental basis.

Still another embodiment relates to a process for the conversion of a hydrocarbon comprising contacting the hydrocarbon and hydrogen with the catalytic composite described above in the first embodiment at hydrocarbon conversion conditions.

A preferred embodiment relates to a process for reforming a low octane gasoline fraction which comprises contacting the gasoline fraction and hydrogen with the catalytic composite described above in the first embodiment at reforming conditions selected to produce a high-octane reformate.

Other objects and embodiments of the present invention relate to additional details regarding essential, preferred and optional catalytic ingredients, preferred amounts of catalytic ingredients, suitable methods of composite preparation, operating conditions for use in the hydrocarbon conversion processes, and the like particulars. These are hereinafter given in the following detailed discussion of each of these facets of the present invention.

An essential feature of the instant bimetallic catalytic composite is that the components thereof are uniformly distributed throughout the porous carrier material. By the use of the expression "uniform distribution of a component throughout a porous carrier material" it is intended to mean that the amount of the component, expressed in wt. % of the carrier material, is approximately the same in any reasonably divisible portion of the carrier material as it is in the entire carrier material. In this connection, "approximately the same " means plus or minus 25% of the nominal value.

The bimetallic catalyst of the present invention comprises a porous carrier material or support having combined therewith catalytically effective amounts of a platinum or palladium component, a ruthenium component, and a halogen component. Considering first the porous carrier material utilized in the present invention, it is preferred that the material be a porous, adsorptive, high-surface area support having a surface area of about 25 to about 500 m²/g. The porous carrier material should be relatively refractory to the conditions utilized in the hydrocarbon conversion process, and it is intended to include within the scope of the present invention carrier materials which have traditionally been utilized in dual-function hydrocarbon conversion catalysts such as: (1) activated carbon, coke, or charcoal; (2) silica or silica gel, silicon carbide, clays and silicates including those synthetically prepared and naturally occurring, which may or may not be acid treated, for example, attapulgus clay, china clay, diatomaceous earth, fuller's earth, kaoline, kieselguhr, ect.; (3) ceramics, porcelain, crushed firebrick, bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc.; (5) crystalline zeolitic aluminosilicates, such as naturally occurring or synthetically prepared mordenite and/or faujasite, either in the hydrogen form or in a form which has been treated with multivalent cations; and, (6) combinations of one or more elements from one or more of these groups. The preferred porous carrier materials for use in the present invention are refractory inorganic oxides, with best results obtained with an alumina carrier material. Suitable alumina materials are the crystalline aluminas known as the gamma-, eta-, and theta-aluminas, with gamma-alumina giving best results. In addition, in some embodiments, the alumina carrier material may contain minor proportions of other well known refractory inorganic oxides such as silica, zirconia, magnesia, etc.; however, the preferred support is substantially pure gamma-alumina. Preferred carrier materials have an apparent bulk density of about 0.3 to about 0.7 g/cc and surface area characteristics such that the average pore diameter is about 20 to 300 Angstroms, the pore volume is about 0.1 to about 1 cc/g and the surface area is about 100 to about 500 m$^2$/g. In general, excellent results are typically obtained with a gamma-alumina carrier material which is used in the form of spherical particles having: a relatively small diameter (i.e., typically about 1/16 inch), an apparent bulk density of about 0.5 g/cc, a pore volume of about 0.4 cc/g, and a surface area of about 175 m$^2$/g.

The preferred alumina carrier material may be prepared in any suitable manner and may be synthetically prepared or natural occurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide to a salt of aluminum such as aluminum chloride, aluminum nitrate, etc., in an amount to form an aluminum hydroxide gel which upon drying and calcining is converted to alumina. The alumina carrier may be formed in any desired shape such as spheres, pills, cakes, extrudates, powders, granules, etc., and utilized in any desired size. For the purpose of the present invention a particularly preferred form of alumina is the sphere; and alumina spheres may be continuously manufactured by the well known oil drop method which comprises: forming an alumina hydrosol by any of the techniques taught in the art and preferably by reacting aluminum metal with hydrochloric acid; combining the resulting hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging and drying treatments in oil and an ammoniacal solution to further improve their physical characteristics. The resulting aged and gelled particles are then washed and dried at a relatively low temperature of about 300° to about 400°F. and subjected to a calcination procedure at a temperature of about 850° to about 1300°F. for a period of about 1 to about 20 hours. This treatment effects conversion of the alumina hydrogel to the corresponding crystalline gamma-alumina. See the teachings of U.S. Pat. No. 2,620,314 for additional details.

One essential ingredient of the subject catalyst is the platinum or palladium component. That is, it is intended to cover the use of platinum or palladium or mixtures thereof as a component of the present bimetallic composite. This platinum or palladium component may exist within the final catalytic composite as a compound such as an oxide, sulfide, halide, oxyhalide, etc., in chemical combination with one or more of the other ingredients of the composite or as an elemental metal. Best results are obtained when substantially all of this component is present in the elemental state. Generally this component may be present in the final catalyst composite in any amount which is catalytically effective but relatively small amounts are preferred. In fact, the platinum or palladium component generally will comprise about 0.01 to about 2 wt. % of the final catalytic composite, calculated on an elemental basis. Excellent results are obtained when the catalyst contains about 0.05 to about 1 wt. % of platinum or palladium.

This platinum or palladium component may be incorporated in the catalytic composite in any suitable manner, such as coprecipitation or cogellation, ion-exchange, or impregnation, known to result in a uniform dispersion of this component in the carrier material. The preferred method of preparing the catalyst involves the utilization of a soluble, decomposable compound of platinum or palladium to impregnate the carrier material. For example, this component may be added to the support by commingling the latter with an aqueous solution of chloroplatinic or chloropalladic acid. Other water-soluble compounds of platinum or palladium may be employed in impregnation solutions and include ammonium chloroplatinate, bromoplatinic acid, platinum dichloride, platinum tetrachloride hydrate, platinum dichlorocarbonyl dichloride, dinitrodiaminoplatinum, palladium chloride, palladium nitrate, palladium sulfate, etc. The utilization of a platinum or palladium chloride compound, such as chloroplatinic or chloropalladic acid, is preferred since it facilitates the incorporation of both the platinum or palladium component and at least a minor quantity of the halogen component in a single step. Best results are obtained in the preferred impregnation step if the platinum or palladium compounds yield complex anions containing platinum or palladium in acidic aqueous solutions. Hydrogen chloride or the like acid is also generally added to the impregnation solution in order to further facilitate the incorporation of the halogen component and the distribution of the metallic component. In addition, it is generally preferred to impregnate the carrier material after it has been calcined in order to minimize the risk of washing away the valuable platinum or palladium compounds; however, in some cases it may be advantageous to impregnate the carrier material when it is in a gelled state.

Yet another essential ingredient of the present catalytic composite is a ruthenium component. This component may be present in the composite as an elemental metal or in chemical combination with one or more of the other ingredients of the composite, or as a chemical compound of ruthenium such as the oxide, oxyhalide, sulfide, halide, and the like. Best results are obtained when substantially all of this component is present in the composite in the elemental state. The ruthenium component may be utilized in the composite in any amount which is catalytically effective, with the preferred amount being about 0.01 to about 2 wt. % thereof, calculated on an elemental ruthenium basis. Typically, best results are obtained with about 0.05 to about 1 wt. % ruthenium. It is additionally, preferred to select the specific amount of ruthenium from within this broad weight range as a function of the amount of the platinum or palladium component, on an atomic basis, as is explained hereinafter.

This ruthenium component may be incorporated into the catalytic composite in any suitable manner known to those skilled in the catalyst formulation art to result in a uniform dispersion of this component in the carrier material. In addition, it may be added at any stage of the preparation of the composite — either during preparation of the carrier material or thereafter — and the precise method of incorporation used is not deemed to be critical so long as this component is relatively uniformly distributed throughout the carrier material. One acceptable procedure for incorporating this component into the composite involves cogelling or co-precipitating the ruthenium component during the preparation of the preferred carrier material, alumina. This procedure usually comprehends the addition of a soluble, decomposable compound of ruthenium such as ruthenium tetrachloride, ruthenium tetrabromide, ruthenium tetraoxide and the like to the alumina hydrosol before it is gelled. The resulting mixture is then finished by conventional gelling, aging, drying and calcination steps as explained hereinbefore. A more preferred way of incorporating this component is an impregnation step wherein the porous carrier material is impregnated with a suitable ruthenium containing-solution either before, during or after the carrier material is calcined. Preferred impregnation solutions are aqueous solutions of water soluble, decomposable ruthenium compounds producing ruthenium-containing complex anions in aqueous solutions such as ammonium chlororuthenate, potassium chlororuthenate, potassium ruthenate, chlororuthenic (IV) acid, chlororuthenic (III) acid, and the like complex compounds. Best results are ordinarily obtained when the impregnation solution is an aqueous solution of chlororuthenic acid or ammonium chlororuthenate. This component can be added to the carrier material either prior to, simultaneously with or after the platinum or palladium component is combined therewith. Best results are usually achieved when this component is added simultaneously with the platinum or palladium component. In fact, excellent results are obtained, as reported in the examples, with an one-step impregnation procedure using an aqueous solution comprising chloroplatinic acid, chlororuthenic acid and hydrochloric acid.

Another essential ingredient of the instant catalytic composite is a halogen component. Although the precise form of the chemistry of the association of the halogen component with the carrier material is not entirely known, it is customary in the art to refer to the halogen component as being combined with the carrier material, or with the other ingredients of the catalyst in the form of the halide (e.g. as the chloride). This combined halogen may be fluorine, chlorine, iodine, bromine, or mixtures thereof. Of these, fluorine and, particularly, chlorine are preferred for the purposes of the present invention. The halogen may be added to the carrier material in any suitable manner either during preparation of the support or before or after the addition of the other components. For example, the halogen may be added at any stage of the preparation of the carrier material or to the calcined carrier material, as an aqueous solution of a suitable decomposable halogen-containing compound such as hydrogen fluoride, hydrogen chloride, hydrogen bromide, ammomium chloride, etc. The halogen component or a portion thereof may be combined with the carrier material during the impregnation of the latter with the platinum or palladium component or the ruthenium component; for example, through the utilization of a mixture of chloroplatinic or chloropalladic acid and hydrogen chloride. In another situation, the alumina hydrosol which is typically utilized to form the preferred alumina carrier material may contain halogen and thus contribute at least a portion of the halogen component to the final composite. For reforming, the halogen will be typically combined with the carrier material in an amount sufficient to result in a final composite that contains about 0.1 to about 3.5 wt. % and preferably about 0.5 to about 1.5 wt. % of halogen calculated on an elemental basis. In isomerization or hydrocracking embodiments, it is generally preferred to utilize relatively large amount of halogen in the catalyst — typically ranging up to about 10 wt. % halogen, calculated on an elemental basis, and more preferably about 1 to about 5 wt. %.

Regarding the preferred amounts of the various metallic components of the subject catalyst, I have found it to be a good practice to specify the amounts of the ruthenium component as a function of the amount of the platinum or palladium component. On this basis, the amount of the ruthenium component is ordinarily selected so that the atomic ratio of ruthenium to the platinum or palladium metal contained in the composite is about 0.1:1 to 10:1, with best results obtained when the atomic ratio is maintained in the range of 0.25:1 to 3:1.

Another significant parameter for the present catalyst is the "total metals content" which is defined to be the sum of the platinum or palladium component and the ruthenium component, calculated on an elemental basis. Good results are ordinarily obtained with the subject catalyst when this parameter is fixed at a value of about 0.2 to about 6 wt. %, with best results ordinarily achieved at a metals loading of about 0.3 to about 2 wt. %.

In embodiments of the present invention wherein the instant catalytic composite is used for dehydrogenation of dehydrogenatable hydrocarbons or for the hydrogenation of hydrogenatable hydrocarbons, it is ordinarily a preferred practice to include an alkali or alkaline earth metal component in the composite. More precisely, this optional component is selected from the group consisting of the compounds of the alkali metals — cesium, rubidium, potassium, sodium and lithium — and the compounds of the alkaline earth metals — calcium, strontium, barium and magnesium. Generally, good results are obtained in these embodiments when this component constitutes about 0.1 to about 5 wt. % of the composite, calculated on an elemental basis.

An optional ingredient for the catalyst of the present invention is a Friedal-Crafts metal halide component. This ingredient is particularly useful in hydrocarbon conversion embodiments of the present invention wherein it is preferred that the catalyst utilized has a strong acid or cracking function associated therewith — for example, an embodiment wherein hydrocarbons are to be hydrocracked or isomerized with the catalyst of the present invention. Suitable metal halides of the Friedel-Crafts type include aluminum chloride, aluminum bromide, ferric chloride, ferric bromide, zinc chloride, and the like compounds, with the aluminum halides and particularly aluminum chloride ordinarily yielding best results. Generally, this optional ingredient can be incorporated into the composite of the present invention by any of the conventional methods for adding metallic halides of this type; however, best results are ordinarily obtained when the metallic halide is sublimed onto the surface of the carrier material according to the preferred method disclosed in U.S. Pat. No. 2,999,074. The component can generally be utilized in any amount which is catalytically effective with a value selected from the range of about 1 to about 100 wt. % of the carrier material generally being preferred.

Another optional component of the instant catalyst is a Group IVA metallic component. By the use of the expression "Group IVA" metallic component it is intended to cover the metals and compounds of the metals of Group IVA of the Periodic Table: to wit, germanium and compounds of germanium, tin and compounds of tin, lead and compounds of lead; and mixtures of these metals and/or compounds of metals. This Group IVA metallic component may be present in the catalytic composite as an elemental metal, or in chemical combination with one or more of the other ingredients of the composite, or as a chemical compound of the Group IVA metal such as the oxide, sulfide, halide, oxyhalide, oxychloride, aluminate, or the like compounds. Based on the evidence currently available, best results are obtained when the Group IVA metallic component exists in the final composite in an oxidation state above that of the elemental metal, and the subsequently described oxidation and reduction steps, that are preferably used in the preparation of the instant composite, are believed to result in a catalytic composite which contains an oxide of the Group IVA metallic component such as germanium oxide, tin oxide and lead oxide. Regardless of the state in which this component exists in the composite, it can be utilized therein in any amount which is catalytically effective with the preferred amount being about 0.01 to about 5 wt. % thereof, calculated on an elemental basis. For instance, in the case where this component is lead, it is preferred to select the amount of this component from the low end of this range — namely, about 0.01 to about 1 wt. %. In the case where this component is tin, it is preferred to select from a relatively broader range of about 0.05 to about 2 wt. % thereof. And in the case where this component is germanium, the selection can be made from a full breadth of the stated range — specifically, about 0.1 to about 5 wt. % thereof, with best results at about 0.05 to about 2 wt. %.

This Group IVA component may be incorporated in the composite in any suitable manner known to the art such as by coprecipitation or cogellation with the porous carrier material, ion exchange with the carrier material, or impregnation of the carrier material at any stage in its preparation. It is to be noted that it is intended to include within the scope of the present invention all conventional procedures for incorporating a metallic component into a catalytic composite, and the particular method of incorporation used is not deemed to be an essential feature of the present invention. However, best results are believed to be obtained when the Group IVA component is uniformly distributed throughout the porous carrier material. Once acceptable method of incorporating the Group IVA component into the catalytic composite involves cogelling the Group IVA component during the preparation of the preferred carrier material, alumina. This method typically involves the addition of a suitable soluble compound of the Group IVA metal of interest to the alumina hydrosol. The resulting mixture is then commingled with a suitable gelling agent such as a relatively weak alkaline reagent, and the resulting mixture is thereafter preferably gelled by dropping into a hot oil bath as explained hereinbefore. After aging, drying and calcining the resulting particles there is obtained an intimate combination of the oxide of the Group IVA metal and alumina. One especially preferred method of incorporating this component into the composite involves utilization of a soluble, decomposable compound of the particular Group IVA metal of interest to impregnate the porous carrier material either before, during or after the carrier material is calcined. In general, the solvent used during this impregnation step is selected on the basis of its capability to dissolve the desired Group IVA compound without affecting the porous carrier material which is to be impregnated; ordinarily, good results are obtained when water is the solvent; thus the preferred Group IVA compounds for use in this impregnation step are typically water-soluble and decomposable. Examples of suitable Group IVA compounds are: germanium difluoride, germanium tetrafluoride, germanium dioxide, germanium monosulfide, tin dibromide, tin dibromide di-iodide, tin dichloride di-iodide, tin chromate, tin difluoride, tin tetrafluoride, tin tetraiodide, tin sulfate, tin tartrate, lead acetate, lead bromate, lead bromide, lead chlorate, lead chloride, lead citrate, lead formate, lead lactate, lead malate, lead nitrate, lead nitrite, lead dithionate, and the like compounds. In the case where the Group IVA component is germanium, a preferred impregnation solution is germanium tetrachloride dissolved in anhydrous ethanol. In the case of tin, tin chloride dissolved in water is preferred. And in the case of lead, lead nitrate in water is preferred. Regardless of which impregnation solution is utilized, the Group IVA component can be impregnated either prior to, simultaneously with, or after the other metallic components are added to the carrier material. Ordinarily, best results are obtained when this component is impregnated simultaneously with the other metallic components of the composite. Likewise, best results are ordinarily obtained when the Group IVA component is germanium or a compound of germanium or tin or a compound of tin.

Regardless of the details of how the components of the catalyst are combined with the porous carrier material, the final catalyst generally will be dried at a temperature of about 200° to about 600°F. for a period of from about 2 to about 24 hours or more, and finally calcined or oxidized at a temperature of about 700° to about 1100°F. in an air atmosphere for a period of about 0.5 to about 10 hours in order to convert the metallic components substantially to the oxide form. Best results are generally obtained when the halogen content of the catalyst is adjusted during the calcination step by including water and a halogen or a decomposable halogen-containing compound in the air atmosphere utilized. In particular, when the halogen component of the catalyst is chlorine, it is preferred to use a mole ratio of $H_2O$ to HCl of about 20:1 to about 100:1 during at least a portion of the calcination step in order to adjust the final chlorine content of the catalyst to a range of about 0.5 to about 1.5 wt. %.

It is preferred that the resultant calcined catalytic composite be subjected to a substantially water-free reduction step prior to its use in the conversion of hydrocarbons. This step is designed to insure a uniform and finely divided dispersion of the metallic components throughout the carrier material. Preferably, substantially pure and dry hydrogen (i.e., less than 20 vol. ppm. $H_2O$) is used in the reducing agent in this step. The reducing agent is contacted with the calcined catalyst at a temperature of about 800° to about 1200°F. and for a period of time of about 0.5 to 10 hours or more effective to reduce substantially all of the platinum or palladium component and the ruthenium component to the elemental state. This reduction treatment may be performed in situ as part of a startup sequence if precautions are taken to predry the plant to a substantially water-free state and if substantially water-free hydrogen is used.

The resulting reduced catalytic composite may, in some cases, be beneficially subjected to a presulfiding operation designed to incorporate in the catalytic composite from about 0.05 to about 0.50 wt. % sulfur calculated on an elemental basis. Preferably, this presulfiding treatment takes place in the presence of hydrogen and a suitable sulfer-containing compound such as hydrogen sulfide, lower molecular weight mercaptans, organic sulfides. etc. Typically, this precedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50 ° up to about 1100°F. or more. It is generally a good practice to perform this optional presulfiding step under substantially water-free conditions.

According to the present invention a hydrocarbon charge stock and hydrogen are contacted with the bimetallic catalyst described above in a hydrocarbon conversion zone. This contacting may be accomplished by using the catalyst in a fixed bed system, a moving bed system, a fluidized bed system, or in a batch type operation; however, in view of the danger of attrition losses of the valuable catalyst and of well known operational advantages, it is preferred to use a fixed bed system. In this system, a hydrogen-rich gas and the charge stock are preheated by any suitable heating means to the desired reaction temperature and then are passed into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also important to note that the reactants may be contacted with the catalyst bed in either upward, downward, or radial flow fashion with the latter being preferred. In addition, the reactants may be in the liquid phase, a mixed liquid-vapor phase, or a vapor phase when they contact the catalyst, with best results obtained in the vapor phase.

In the case where the catalyst of the present invention is used in a reforming operation, the reforming system will comprise a reforming zone containing a fixed bed of the catalyst type previously characterized. This reforming zone may be one or more separate reactors with suitable heating means therebetween to compensate for the endothermic nature of the reactions that take place in each catalyst bed. The hydocarbon feed stream that is charged to this reforming system will comprise hydrocarbon fractions containing naphthenes and paraffins that boil within the gasoline range. The preferred charge stocks are those consisting essentially of naphthenes and paraffins, although in many cases aromatics will also be present. This preferred class includes straight run gasolines, natural gasolines, synethetic gasolines, and the like. On the other hand, it is frequently advantageous to charge thermally or catalytically cracked gasolines or higher boiling fractions thereof. Mixtures of straight run and cracked gasolines can also be used to advantage. The gasoline charge stock may be a full boiling gasoline having an initial boiling point of from about 50° to about 150°F. and an end boiling point within the range of from about 325° to about 425°F., or may be a selected fraction thereof which generally will be a higher boiling fraction commonly referred to as a heavy naphtha — for example, a naphtha boiling in the range of $C_7$ to 400°F. In some cases it is also advantageous to charge pure hydrocarbons or mixtures of hydrocarbons that have been extracted from hydrocarbon distillates — for example, straight-chain paraffins — which are to be converted to aromatics. It is preferred that these charge stocks be treated by conventional catalytic pretreatment methods such as hydrorefining, hydrotreating, hydrodesulfurization, etc., to remove substantially all sulfurous, nitrogenous and water-yielding contaminants therefrom, and to saturate any olefins that may be contained therein.

In other hydrocarbon conversion embodiments, the charge stock will be of the conventional type customarily used for the particular kind of hydrocarbon conversion being effected. For example, in a typical isomerization embodiment the charge stock can be a paraffinic stock rich in $C_4$ to $C_8$ normal paraffins, or a normal butane-rich stock or a n-hexane-rich stock or a mixture of xylene isomers, etc. In hydrocracking embodiments the charge stock will be typically a gas oil, heavy cracked cycle oil, etc. In addition, alkylaromatics and naphthenes can be conveniently isomerized by using the catalyst of the present invention. Likewise, pure hydrocarbons or substantially pure hydrocarbons can be converted to more valuable products by using the catalyst of the present invention in any of the hydrocarbon conversion processes known to the art that use a dual-function catalyst.

In a reforming embodiment, it is generally a preferred practice to use the present catalystic composite in a substantially water-free environment. Essential to the achievement of this condition in the reforming zone is the control of the amount of water and water-producing compounds present in the charge stock and the hydrogen stream which are being charged to the zone. Best results are ordinarily obtained when the total amount of water entering the conversion zone from any source is held to a level substantially less than 50 ppm., and preferably less than 20 ppm., expressed as weight of equivalent water in the charge stock. In general, this can be accomplished by an appropriate pretreatment of the charge stock coupled with the careful control of the water present in the charge stock and in the hydrogen stream; the charge stock can be dried by using any suitable drying means known to the art such as a conventional solid adsorbent having a high selectivity for water; for instance, sodium or calcium crystalline aluminosilicates, silica, gel, activated alumina, molecular sieves, anhydrous calcium sulfate, high surface area sodium and the like adsorbents. Similarly, the water content of the charge stock may be adjusted by suitable stripping operations in a fractionation column or like device. And in some cases, a combination of adsorbent drying and distillation drying may be used advantageously to effect almost complete removal of water from the charge stock. Preferably, the charge stock is dried to a level corresponding to less than 20 ppm. of $H_2O$ equivalent. In general, it is preferred to control the water content of the hydrogen stream entering the hydrocarbon conversion zone within a level of about 5 to 20 vol. ppm. of water or less.

In the reforming embodiment, an effluent stream is withdrawn from the reforming zone and passed through a cooling means to a separation zone, typically maintained at about 25° to 150°F., wherein a hydrogen-rich gas is separated from a high octane liquid product, commonly called an "unstabilized" reformate. When the water content of the hydrogen-rich gas is greater than desired, a portion of this hydrogen-rich gas is withdrawn from the separating zone and passed through an adsorption zone containing an adsorbent selective for water. The resultant substantially water-free hydrogen stream is then recycled through suitable compressing means back to the reforming zone. If the water content of the hydrogen-rich gas is within the range specified, then a substantial portion of it can be directly recycled to the reforming zone. the liquid phase from the separating zone is typically withdrawn and commonly treated in a fractionating system in order to adjust the butane concentration, thereby controlling front-end volatility of the resulting reformate.

The conditions utilized in the numerous hydrocarbon conversion embodiments of the present invention are those customarily used in the art for the particular reaction or combination or reactions that is to be effected. For instance, alkylaromatic and paraffin isomerication conditions include: a temperature of about 32° to about 1000°F. and preferably about 75° to about 600°F.; a pressure of atmospheric to about 100 atmospheres; a hydrogen to hydrocarbon mole ratio of about 0.5:1 to about 20:1; and an LHSV (calculated on the basis of equivalent liquid volume of the charge stock contacted with the catalyst per hour divided by the volume of conversion zone containing catalyst) of about 0.2 hr.$^{-1}$ to 10 hr.$^{-1}$. Dehydrogenation conditions include: a temperature of about 700° to about 1250°F.; a pressure of about 0.1 to about 10 atmospheres; a liquid hourly space velocity of about 1 to 40 hr.$^{-1}$; and a hydrogen to hydrocarbon mole ratio of about 1:1 to 20:1. Likewise, typically hydrocracking conditions include: a pressure of about 500 psig. to about 3,000 psig.; a temperature of about 400° to about 900°F; an LHSV of about 0.1 hr$^{-1}$ to about 10 hr.$^{-1}$; and hydrogen circulation rates of about 100 to 10,000 SCF per barrel of charge.

In the reforming embodiment of the present invention the pressure utilized is selected from the range of about 0 psig. to about 1000 psig., with the preferred pressure being about 50 psig, to about 350 psig. Particularly good results are obtained at low pressure; namely, a pressure of about 75 to 200 psig. In fact, it is a singular advantage of the present invention that it allows stable operation at lower pressures than have heretofore been successfully utilized in so-called "continuous" reforming systems with a monometallic catalyst (i.e., reforming for periods of about 15 to about 200 or more barrels of charge per pound of catalyst without regeneration). In other words, the catalyst of the present invention allows the operation of a continuous reforming system to be conducted at lower pressure (i.e., 50 to about 350 psig.) for about the same or better catalyst life before regeneration as has been heretofore realized with conventional monometallic catalysts at higher pressures (i.e., 400 to 600 psig.). On the other hand, the stability feature of the present invention enables reforming operations conducted at pressures of 400 to 600 psig. to achieve substantially increased catalyst life before regeneration.

Similarly, the temperature required for reforming is generally lower than that required for a similar reforming operation using a high quality monometallic platinum catalyst of the prior art. This significant and desirable feature of the present invention is a consequence of the selectivity of the catalyst of the present invention for the octane-upgrading reactions that are preferably induced in a typical reforming operation. Hence, the present invention requires a temperature in the range of from about 800° to about 1100°F. and preferably about 900° to about 1050°F. As is well known to those skilled in the continuous reforming art, the initial selection of the temperatue within this broad range is made primarily as a function of the desired octane of the product reformate considering the characteristics of the charge stock and the catalyst. Ordinarily, the temperature then is thereafter slowly increased during the run to compensate for the inevitable deactivation that occurs to provide a constant octane product. Therefore, it is a feature of the present invention that the rate at which the temperature is increased in order to maintain a constant octane product is substantially lower for the catalyst of the present invention than for the high quality monomentallic platinum reforming catalyst which is manufactured in exactly the same manner as the catalyst of the present invention except for the inclusion of the ruthenium component. Moreover, for the catalyst of the present invention, the $C_5^+$ yield loss for a given temperature increase is substantially lower than for a high quality monometallic reforming catalyst of the prior art. In addition, hydrogen production is substantially higher.

The reforming embodiment of the present invention also typically utilizes sufficient hydrogen to provide an amount of about 1 to about 20 moles of hydrogen per mole of hydrocarbon entering the reforming zone, with excellent results being obtained when about 5 to about 10 moles of hydrogen are used per mole of hydrocarbon. Likewise, the liquid hourly space velocity (LHSV) used in reforming is selected from the range of about 0.1 to about 10 hr.$^{-1}$ with a value in the range of about 1.0 to about 5 hr.$^{-1}$ being preferred. In fact, it is a feature of the present invention that it allows operations to e conducted at higher LHSV than normally can be stably achieved in a continuous reforming process with a high quality monometallic platinum reforming catalyst of the prior art. This last feature is of immense economic significance because it allows a continuous reforming process to operate at the same throughput level with less catalyst inventory than that heretofore used with conventional reforming catalysts at no sacrifice in catalyst life before regeneration.

The following working examples are given to illustrate further the preparation of the catalytic composite of the present invention and the use thereof in the conversion of hydrocarbons. It is understood that the examples are intended to be illustrative rather than restrictive.

EXAMPLE I

This example demonstrates a particularly good method of preparing the catalytic composite of the present invention.

A gamma-alumina carrier material comprising 1/16 inch spheres was prepared by: forming an aluminum hydroxyl chloride sol by dissolving substantially pure aluminum pellets in a hydrochloric acid solution, adding hexamethylenetetramine to the resulting sol, gelling the resulting solution by dropping it into an oil bath to form spherical particles of an aluminum hydrogel, aging and washing the resulting particles and finally drying and calcining the aged and washed particles to form spherical particles of gamma-alumina containing about 0.3 wt. % combined chloride. The resulting particles were also sulfur-free. Additional details as to this method of preparing the preferred carrier material are given in the teachings of U.S. Pat. No. 2,620,314.

A sulfur-free aqueous impregnation solution containing chlororuthenic acid, chlorophatinic acid and hydrogen chloride was then prepared. This solution contained hydrogen chloride in an amount corresponding to about 2 wt. % of the carrier material which was impregnated. The solution was then used to impregnate the gamma-alumina particles.

It contained the metallic ingredients in amounts, respectively, calculated to result in a final composite containing 0.375 wt. % platinum and 0.375 wt. % ruthenium. In order to insure uniform dispersion of the metallic components through the carrier material, this impregnation step was performed by adding the carrier material particles to the impregnation solution with constant agitation. In addition, the volume of the solution was about two times the volume of the carrier material particles. The impregnation mixture was maintained in contact with the carrier material particles for a period of about one-half hour at a temperature of about 70°F. Thereafter, the temperature of the impregnation mixture was raised to about 225°F. and the excess solution evaporated in a period of about 1 hour. The resulting dried particles were then subjected to an oxidation treatment with a sulfur-free gas stream containing about 20 vol. % $O_2$ at a temperature of about 977°F. for about 15 minutes. The calcined spheres were then contacted with a sulfur-free gas stream containing $H_2O$, HCl and about 20 vol. % $O_2$, the $H_2O$ and HCl being present in a mole ratio of about 50:1 to about 70:1 for about 2 hours at 975°F. in order to adjust the halogen content of the catalyst particles to a value of about 0.9 wt. %. Thereafter the resulting oxidized catalyst was contacted with a dry hydrogen stream at 1050°F., about 1 atmosphere pressure and GHSV of about 500 hr.$^{-1}$ for about 1 hour.

The resulting catalyst particles were analyzed and found to contain, on an elemental basis, about 0.375 wt. % platinum, about 0.375 wt. % ruthenium, and about 1.05 wt. % chloride. For this catalyst, the atomic ratio of ruthenium to platinum was about 1.94:1. This catalyst is hereinafter designated as catalyst "A".

EXAMPLE II

Another catalyst was prepared according to the method given in Example I except that the amount of chlororuthenic acid used was adjusted to result in a final catalyst containing 0.2 wt. % ruthenium. The resulting catalyst is designated catalyst "B". It comprises 0.375 wt. % platinum, 0.2 wt. % ruthenium and 0.9 wt. % chloride in conbination with gamma-alumina carrier material. The atomic ratio of ruthenium to platinum for this catalyst was 1.02:1.

EXAMPLE III

In order to compare the novel catalyst composite of the present invention with superior reforming catalysts of the prior art in a manner calculated to bring out the beneficial interaction between the ruthenium component and the platinum component, a comparison test was made between the bimetallic catalysts of the present invention, catalysts A and B and a high quality reforming catalyst of the prior art. The control catalyst, catalyst C, comprised 0.375 wt. % platinum and 0.98 wt. % chloride in combination with a gamma-alumina carrier material. It was prepared by a method analogous to that given in Example I for catalyst A except that the impregnation solution used did not contain any chlororuthenic acid.

These catalysts were then separately subjected to a high stress evaluation test designed to determine their relative activity and selectivity for the reforming of a gasoline charge stock. In all tests the same charge stock was utilized, its characteristics are given in Table I. It is to be noted that this test is conducted under a substantially water-free condition with te only significant source of water being the 5 wt. ppm. present in the charge stock.

TABLE I

| ANALYSIS OF HEAVY NAPHTHA | |
|---|---|
| API Gravity at 60° F. | 60.3 |
| Initial boiling point, ° F. | 162 |
| 10% boiling point, ° F. | 200 |
| 50% boiling point, ° F. | 252 |
| 90% boiling point, ° F. | 322 |
| End boiling point, ° F. | 364 |
| Sulfur, wt. ppm. | 0.1 |
| Nitrogen, wt. ppm. | 0.1 |

TABLE I-Continued

ANALYSIS OF HEAVY NAPHTHA

| | |
|---|---|
| Aromatics, vol. % | 11.1 |
| Paraffins, vol. % | 67.1 |
| Naphthenes, vol. % | 21.8 |
| Water, ppm. | 5 |
| Octane No., F-1 clear | 43.8 |

This test was specifically designed to determine in a very short time period whether the catalyst being evaluated has superior characteristics for the reforming process. It consisted of eight periods comprising of 6 hour line-out period at 970°F., three 10 hour test period at 970°F., another 6 hour line-out period at 1000°F. and three 10 hour test periods at 1000°F. During each test period, a $C_5^+$ product reformate was collected. The test was preformed in a laboratory scale reforming plant comprising a reactor containing the catalyst undergoing evalutaion, a hydrogen separating zone, a debutanizer column, suitable heating, pumping, and condensing means, etc.

Conditions utilized in this test are: a constant inlet reactor temperature of about 970°F. for the first three test periods followed by a constant temperature of about 1000°F. for the last three test periods, a liquid hourly space velocity of 3.0 hr.$^{-1}$, an outlet pressure of the reactor of 100 psig., and a mole ratio of hydrogen to hydrocarbon entering the reactor of about 5:1. This two temperature test is designed to quickly and efficiently yield two points on the yield-octane curve for the particular catalyst. The conditions utilized are selected on the basis of experience to yield the maximum amount of information on the capability of the catalyst being tested to respond to a high severity operation.

The results of the separate tests performed on the catalysts of the present invention, catalysts A and B, and the control catalyst, catalyst C, are presented for each test period in Table II in terms of inlet temperature to the reactor in ° F., net excess separator gas in standard cubic feet per barrel of charge (SCF/bbl), debutanizer overhead gas in SCF/bbl, the ratio of the debutanizer gas make to the total gas make and F-1 clear octane number of the product reformate.

TABLE II

RESULTS OF ACCELERATED REFORMING TESTS

| Period No. | T, ° F. | Sep. Gas SCF/bbl | Debut. Gas SCF/bbl | Debut. Gas Total Gas Ratio | Octane No. F-1 Clear |
|---|---|---|---|---|---|
| Catalyst "A" — 0.375 wt. % platinum, 0.375 wt. % ruthenium and 1.05 wt. % chlorine. | | | | | |
| 1 | 970 | 1302 | 93 | .066 | 94.6 |
| 2 | 970 | 1224 | 89 | .068 | — |
| 3 | 970 | 1176 | 86 | .068 | 91.4 |
| 4 | 1000 | 1236 | 101 | .076 | 94.5 |
| 5 | 1000 | 1151 | 103 | .082 | — |
| 6 | 1000 | 1081 | 104 | .087 | 90.4 |
| Catalyst "B" — 0.375 wt. % platinum, 0.2 wt. % ruthenium, and 0.9 wt. % chlorine. | | | | | |
| 1 | 970 | 1328 | 110 | .077 | 96.6 |
| 2 | 970 | 1271 | 106 | .077 | — |
| 3 | 970 | 1242 | 108 | .080 | 94.2 |
| 4 | 1000 | 1302 | 122 | .085 | 96.5 |
| 5 | 1000 | 1201 | 122 | .092 | — |
| 6 | 1000 | 1127 | 125 | .100 | 93.6 |
| Catalyst "C" — 0.375 wt. % platinum and 0.98 wt. % chlorine. | | | | | |
| 1 | 970 | 1266 | 93 | .068 | 94.7 |
| 2 | 970 | 1201 | 97 | .075 | — |
| 3 | 970 | 1140 | 99 | .080 | 92.5 |
| 4 | 1000 | 1159 | 121 | .094 | 93.7 |
| 5 | 1000 | 1088 | 127 | .104 | — |
| 6 | 1000 | 1016 | 134 | .117 | 91.3 |

In this plant, a hydrogen recycle stream and the charge stock are commingled and heated to the desired conversion temperature. The resulting mixture is then passed downflow into a reactor containing the catalyst being tested as a fixed bed. An effluent stream is then withdrawn from the bottom of the reactor, cooled to about 55°F. and passed to the separating zone wherein a hydrogen-rich gaseous phase separates from a liquid phase. The hydrogen-rich gaseous phase is then withdrawn from the separating zone and a portion of it is continuously passed through a high surface area sodium scrubber. The resulting substantially water-free hydrogen stream is then recycled to the reactor in order to supply hydrogen for the reaction. The excess hydrogen over that needed for recycle is recovered as excess separator gas. Moreover, the liquid phase from the separating zone is withdrawn therefrom and passed to the debutanizer column wherein light ends are taken overhead as debutanizer gas and a $C_5^+$ reformate stream recovered as bottoms.

Referring now to the results in Table II of the separate tests performed on these catalysts, it is evident that the principal effect of the ruthenium component is to selectively promote the platinum component of the catalyst. The data clearly shows that the catalysts of the present invention are superior or equivalent to the control catalyst in activity for reforming. As was pointed out hereinbefore, a good measure of activity for a reforming catalyst is octane number of reformate produced at the same conditions; on this basis catalyst B was more active than the control catalyst at both temperature conditions, and catalyst A was essentially equivalent in activity to the control catalyst. However, activity is only half of the story; activity must be coupled with selectivity to demonstrate superiority. Selectivity is measured directly by reference to $C_5^+$ yield and indirectly be reference to hydrogen separator gas make, which is essentially equivalent to net hydrogen make (n.b. hydrogen is a product of the preferred octane upgrading reactions and its production indicates the extent to which these reactions occur) and by reference to debutanizer gas make which is a rough measure of undesired hydrocracking and should be minimized for a highly selective catalyst. Thus selectivity can be measured by comparing separator gas make numbers, the more selective catalyst having the greater value, and debutanizer gas numbers, the more selective catalyst having the lesser value. These two indicators can be combined to yield an extremely sensitive selectivity indicator by taking the ratio of debutanizer gas make to total gas make (i.e. the sum of debutanizer gas make and separator gas make). This last indicator is minimized for a highly selective catalyst. Referring again to the data presented in Table II, and using these selectivity criteria, it is immediately apparent that the catalysts of the present invention are more selective than the control catalyst at 1000°F. (the more severe condition) and equivalent to the control catalyst at 970°F. Thus, the instant catalyst demonstrates increased selectivity at the more severe conditions coupled with ability to maintain good activity at these conditions.

It is intended to cover by the following claims all changes and modifications of the above disclosure of the present invention which would be self-evident to a man of ordinary skill in the catalyst formulation art or the hydrocarbon conversion art.

I claim as my invention:

1. A process for catalytic reforming of a gasoline fraction to produce a high-octane reformate which comprising contacting the gasoline fraction in the presence of hydrogen at reforming conditions with a catalytic composite comprising a porous carrier material containing, on an elemental basis, about 0.01 to about 2 wt. % platinum or palladium metal, about 0.01 to about 2 wt. % ruthenium metal, and about 0.1 to about 3.5 wt. % halogen, wherein the platinum or palladium metal and the ruthenium metal are uniformly dispersed throughout the porous carrier material, wherein substantially all of the platinum or palladium metal and the ruthenium metal are present in the corresponding elemental metallic states, and wherein substantially all of the halogen is present in the form of conbined halide.

2. A process as defined in claim 1 wherein the porous carrier material is a refractory inorganic oxide.

3. A process as defined in claim 2 wherein the refractory inorganic oxide is alumina.

4. A process as defined in claim 1 wherein the halogen is combined chloride.

5. A process as defined in claim 1 wherein the halogen is combined fluoride.

6. A process as defined in claim 1 wherein the composite contains, on an elemental basis, about 0.05 to about 1 wt. % platinum or palladium, about 0.05 to about 1 wt. % ruthenium and about 0.5 to about 1.5 wt. % halogen.

7. A process as defined in claim 1 wherein the atomic ratio of ruthenium metal to platinum or palladium metal contained in the composite is about 0.1:1 to about 10:1.

8. A process as defined in claim 1 wherein the catalytic composite contains sulfur in an amount of about 0.05 to about 0.5 wt. %, calculated on an elemental basis.

9. A process as defined in claim 1 wherein the catalytic composite contains a Group IVA metallic component in an amount of about 0.01 to about 5 wt. % thereof, calculated on an elemental basis and wherein substantially all of the Group IVA metallic component is present therein in an oxidation state above that of the elemental metal.

10. A process as defined in claim 9 wherein the Group IVA metallic component is germanium.

11. A process as defined in claim 9 wherein the Group IVA metallic component is tin.

12. A process as defined in claim 9 wherein the Group IVA metallic component is lead.

13. A process as defined in claim 1 wherein the atomic ratio of ruthenium metal to platinum or palladium metal contained in the composite is about 0.25:1 to about 3:1.

14. A process as defined in claim 1 wherein the contacting of the hydrocarbon with the catalytic composite is performed in the presence of hydrogen.

15. A process as defined in claim 1 wherein the reforming conditions include a temperature of about 800° to about 1100°F., a presssure of about 0 to about 1,000 psig., a liquid hourly space velocity of about 0.1 to about 10 hr.$^{-1}$ and a mole ratio of hydrogen to hydrocarbon of about 1:1 to about 20:1.

16. A process as defined in claim 1 wherein the contacting is performed in a substantially water-free environment.

17. A process as defined in claim 1 wherein the reforming conditions include a pressure of about 50 to about 350 psig.

* * * * *